(12) United States Patent
Duckek et al.

(10) Patent No.: US 8,128,099 B2
(45) Date of Patent: Mar. 6, 2012

(54) GASKET

(75) Inventors: Uwe Duckek, Markbronn (DE); Georg Egloff, Weissenhorn (DE); Kurt Höhe, Langenau (DE); Günther Unseld, Neenstetten (DE); Hans Waldvogel, Thannhausen (DE)

(73) Assignee: Dana Automotive Systems Group, LLC, Maumee, OH (US)

( * ) Notice: Subject to any disclaimer, the term of this patent is extended or adjusted under 35 U.S.C. 154(b) by 981 days.

(21) Appl. No.: 12/148,992

(22) Filed: Apr. 24, 2008

(65) Prior Publication Data

US 2009/0072493 A1 Mar. 19, 2009

Related U.S. Application Data

(63) Continuation-in-part of application No. 10/546,745, filed on Nov. 14, 2005, now abandoned.

(30) Foreign Application Priority Data

Apr. 24, 2007 (EP) .................................... 07008321

(51) Int. Cl.
*F16J 15/02* (2006.01)
*F02F 11/00* (2006.01)

(52) U.S. Cl. ...................................................... 277/594
(58) Field of Classification Search .................. 277/593, 277/594
See application file for complete search history.

(56) References Cited

U.S. PATENT DOCUMENTS

| 4,803,965 | A | 2/1989 | Udagawa et al. |
| 4,834,399 | A | 5/1989 | Udagawa et al. |
| 4,993,723 | A * | 2/1991 | Sroka et al. ................... 277/596 |
| 5,199,723 | A | 4/1993 | Udagawa |
| 5,478,092 | A | 12/1995 | Ishikawa |
| 5,685,547 | A | 11/1997 | Jargeaix |
| 5,725,223 | A | 3/1998 | Yamada et al. |
| 5,951,021 | A | 9/1999 | Ueta |
| 6,105,971 | A | 8/2000 | Hasegawa |
| 6,705,619 | B2 | 3/2004 | Miyaoh |
| 6,769,696 | B2 | 8/2004 | Diez et al. |
| 7,000,924 | B2 | 2/2006 | Hohe et al. |
| 7,025,358 | B2 | 4/2006 | Ueta et al. |
| 7,475,882 | B2 * | 1/2009 | Antonini et al. .............. 277/596 |
| 7,748,716 | B2 * | 7/2010 | Hegmann ...................... 277/591 |
| 2002/0153666 | A1 * | 10/2002 | Unseld .......................... 277/593 |
| 2003/0015845 | A1 | 1/2003 | Miyaoh |
| 2004/0160017 | A1 | 8/2004 | Diez et al. |
| 2005/0093248 | A1 | 5/2005 | Udagawa |
| 2005/0173868 | A1 * | 8/2005 | Hatamura et al. ............ 277/593 |
| 2005/0206091 | A1 * | 9/2005 | Detmann et al. ............. 277/594 |
| 2006/0097459 | A1 | 5/2006 | Hohe et al. |
| 2006/0175763 | A1 | 8/2006 | Duckek et al. |
| 2006/0290072 | A1 * | 12/2006 | Chen et al. .................... 277/593 |
| 2007/0013145 | A1 * | 1/2007 | Detmann et al. ............. 277/593 |

(Continued)

FOREIGN PATENT DOCUMENTS

CH 268267 8/1950

(Continued)

*Primary Examiner* — Gilbert Lee
(74) *Attorney, Agent, or Firm* — Marshall & Melhorn LLC

(57) ABSTRACT

A gasket may have at least one metallic layer with at least one combustion gas through-opening and at least one fastener through-opening. The fastener through-opening may be at least partially circumferentially bounded by a deformation limiter having a plurality of troughs and crests. All of the troughs and crests are substantially aligned with one another.

31 Claims, 6 Drawing Sheets

U.S. PATENT DOCUMENTS

2007/0210532 A1 * 9/2007 Hegmann ............... 277/593

FOREIGN PATENT DOCUMENTS

| | | |
|---|---|---|
| DE | 1 425 524 | 3/1969 |
| DE | 2118610 | 10/1972 |
| DE | 196 34 964 A1 | 3/1997 |
| DE | 196 41 491 A1 | 4/1998 |
| DE | 198 29 058 A1 | 1/2000 |
| DE | 100 60 872 A1 | 1/2002 |
| DE | 20 2006 003 678 U | 6/2006 |
| DE | 20200600367 U | 6/2006 |
| EP | 0 581 615 B1 | 7/1993 |
| EP | 0 581 615 A1 | 2/1994 |
| EP | 0 736 709 A1 | 3/1996 |
| EP | 0 780 604 A1 | 6/1997 |
| EP | 0 816 722 A1 | 1/1998 |
| EP | 0 927 844 A2 | 7/1999 |
| EP | 1577589 A1 | 9/2005 |
| EP | 1635093 A1 | 3/2006 |
| GB | 1273407 | 5/1972 |
| JP | 57-176651 | 11/1982 |
| JP | 62113968 | 5/1987 |
| JP | 01-285645 | 11/1989 |
| JP | 07-041137 | 2/1995 |
| WO | WO 9522020 | 8/1995 |
| WO | WO 01/96768 A1 | 12/2001 |
| WO | WO 2008/019638 A1 | 2/2008 |

* cited by examiner

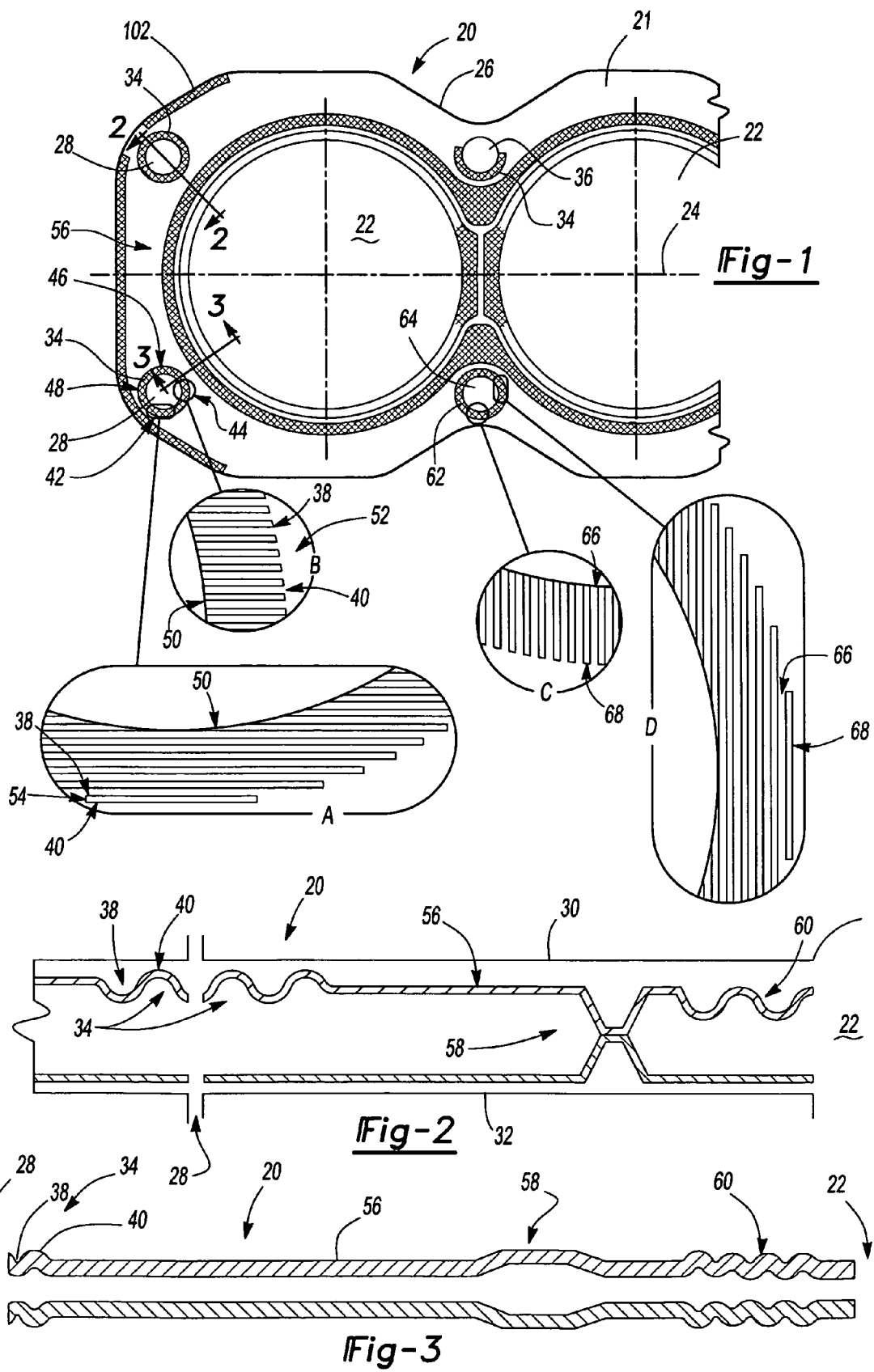

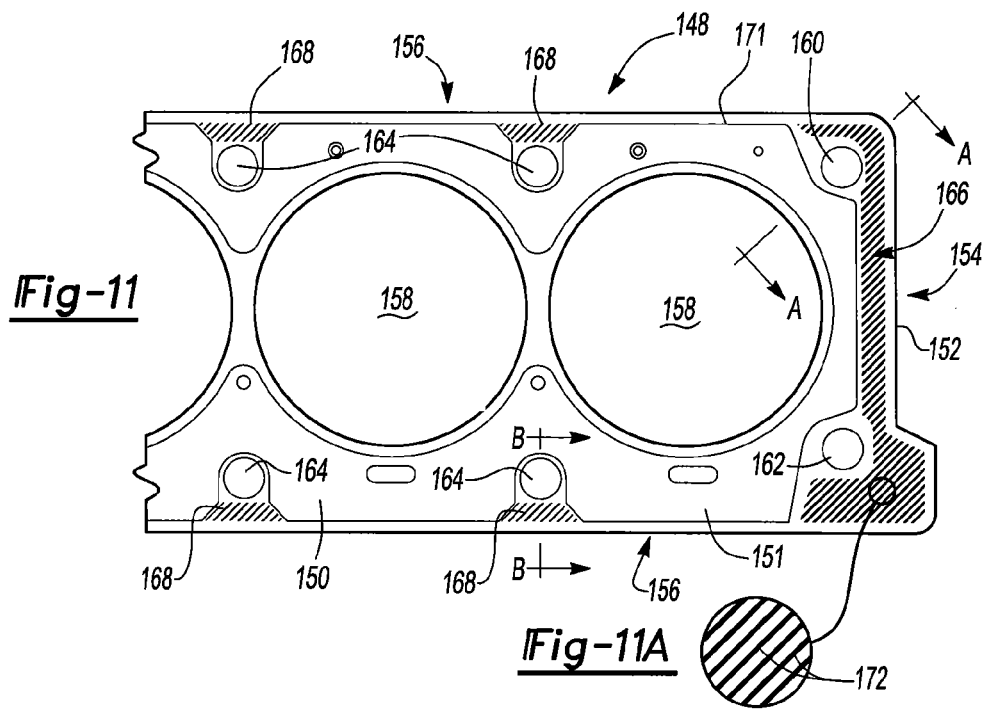
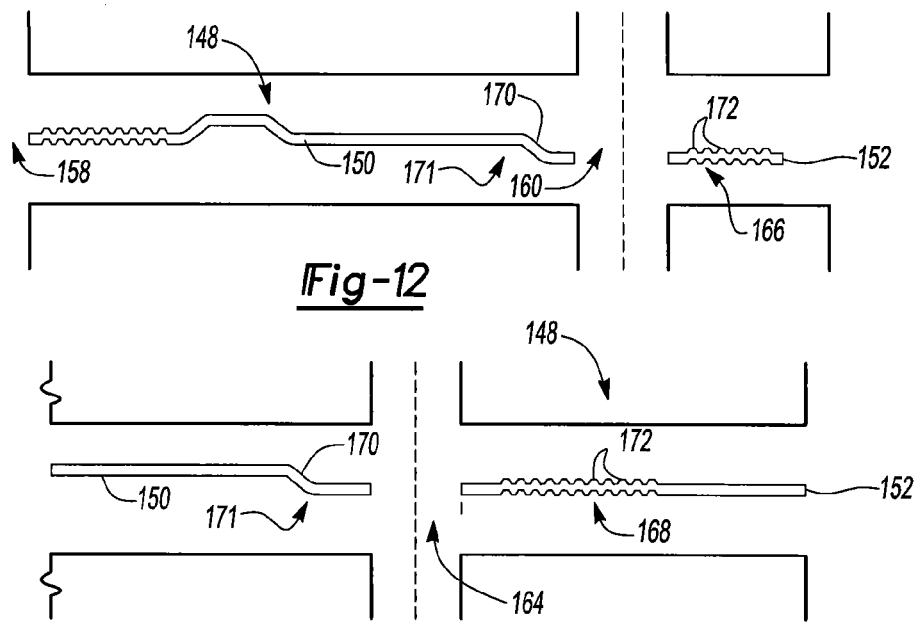
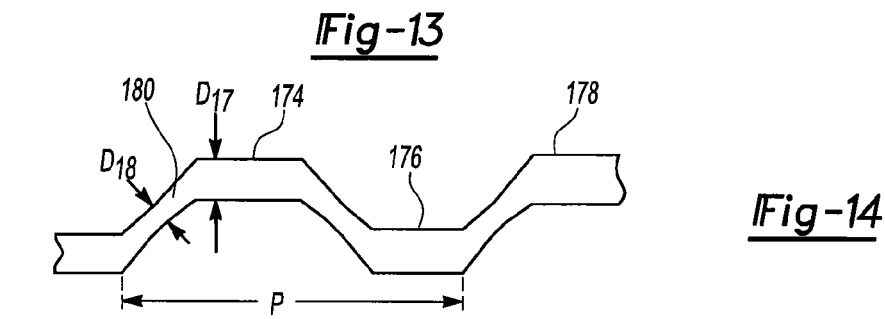

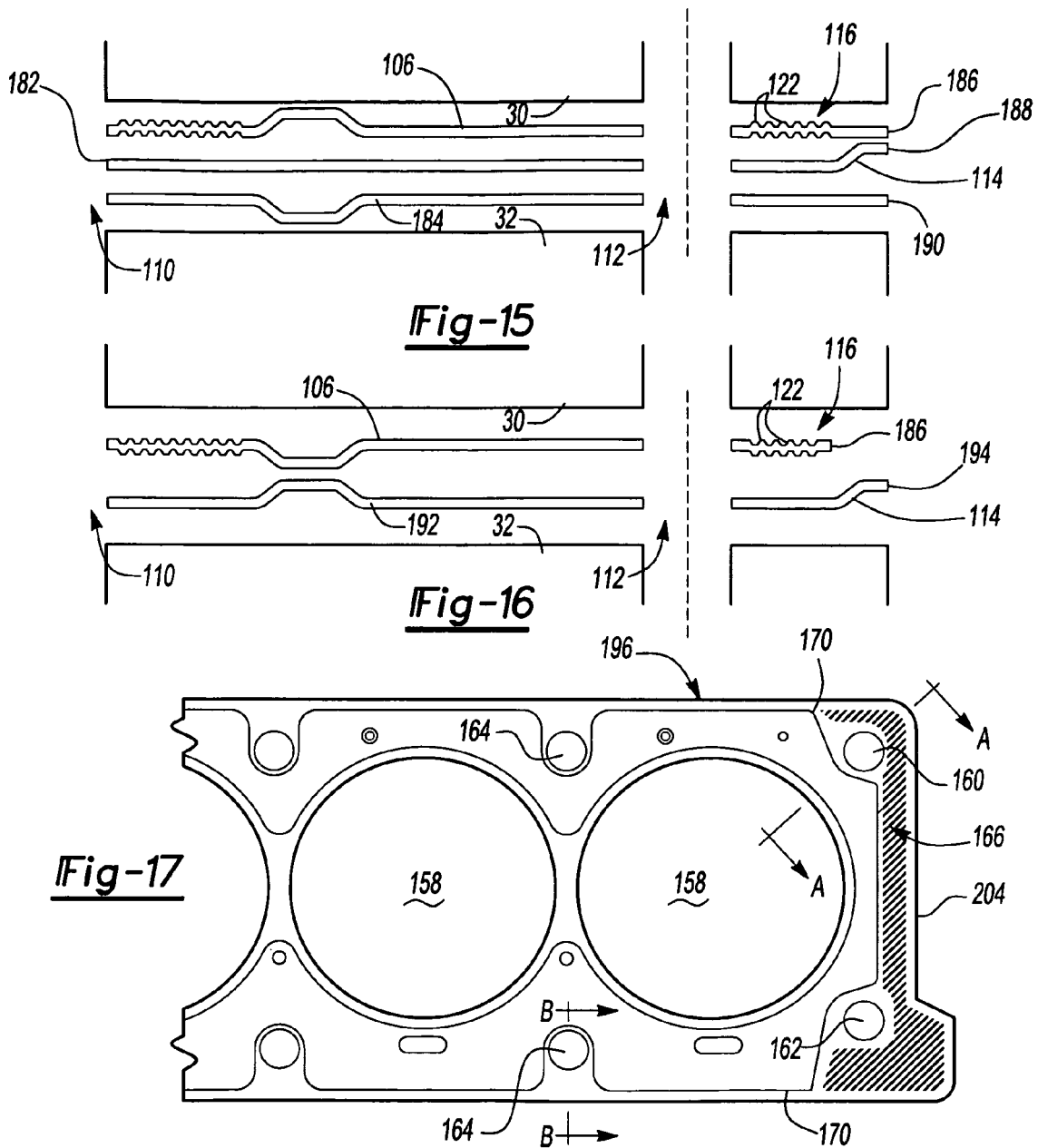
Fig-15
Fig-16
Fig-17
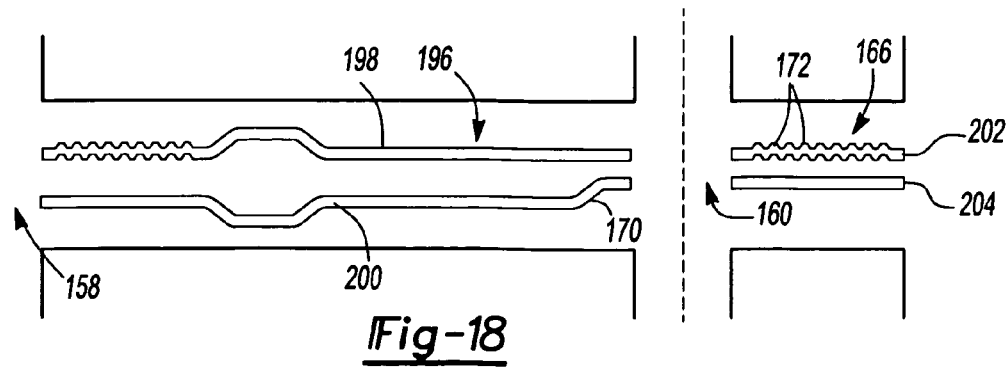
Fig-18

GASKET

RELATED APPLICATIONS

This application is a continuation-in-part application of application Ser. No. 10/546,745 filed on Nov. 14, 2005 now abandoned titled Cylinder Head Gasket which is incorporated by reference in its entirety. This application also claims priority to European patent application serial no. 0700832.7 filed on Apr. 24, 2007, which is also incorporated by reference in its entirety.

FIELD OF THE INVENTION

The present invention relates to gaskets, such as cylinder head gaskets, flange gaskets and exhaust manifold gaskets.

BACKGROUND OF THE INVENTION

Gaskets are well-known devices used for connecting two structures together in a fluid tight manner. Openings may be located in a gasket to permit fluid to pass from the first structure to the second structure through the gasket. The gasket may also have openings for receiving mechanical fasteners that permit the gasket to be secured to the first structure and the second structure.

The openings through which fluid passes from the first structure to the second structure are sealed by resilient sealing elements, e.g. beads or sealing elements from elastomer, the latter only being applicable below particular temperatures. Sealing can thus be achieved individually for each opening as is usually the case for combustion gas openings or jointly for several openings as is often the case for other through openings. At least for the combustion gas openings, the sealing beads are often accompanied by a bead deformation limiter which restricts the load deflection of the bead. However, this bead deformation limiter often causes a deformation of the structures to be sealed, especially if they contain regions of varying rigidity. Apart from the latter, it is the edge regions and the regions of the fastener through-openings that are especially exposed to the danger of deformation.

Various prior art devices exist to smoothen the distribution of the forces over the area of the gasket and try to take into account the varying rigidities of the structures to be sealed. These devices, however, suffer from failing to effectively function as a seal and/or to be efficiently and cost-effectively produced. Thus, it would be advantageous to have a gasket that effectively functioned as a seal and simultaneously prevented deformations in the structures to be sealed, especially in the region of the fastener through-openings and near the edges of the gasket.

SUMMARY OF THE INVENTION

In one embodiment, the gasket according to the present invention may have at least one metallic layer having at least one through-opening, such as a combustion gas through-opening (e.g. a cylinder through-opening), and at least one fastener through-opening. The fastener through-opening may be at least partially circumferentially bounded by a deformation limiter comprised of a plurality of troughs and crests. The troughs and crests are substantially aligned with one another around the fastener through-opening along a longitudinal axis of the layer.

In another embodiment, at least one metallic layer may be provided having an outermost peripheral edge that entirely bounds at least one cylinder through-opening and at least two fastener through-openings. A half bead that is unitary with the layer and located immediately inwardly adjacent the outer peripheral edge may be provided.

The gasket may have a first deformation limiter unitary with the layer. The deformation limiter may extend substantially continuously from one of the fastener through-openings to another of the fastener through-openings. Optionally, a second deformation limiter unitary with the layer may also be provided. The second deformation limiter if present may be separated from the first deformation limiter, and located between one of the fastener through-openings and the edge.

The first and the second deformation limiters are both comprised of a plurality of troughs and crests. All of the troughs and crests are substantially aligned with one another and oriented substantially transverse to the plane of the layer.

In another embodiment, the gasket may have at least one metallic layer with an outermost peripheral edge defining a substantially rectangular gasket with at least one short side and two long sides. The edge entirely bounds at least one combustion gas through-opening, a first corner fastener through-opening, at least a second corner fastener through-opening and at least two side fastener through-openings all in the layer.

A first deformation limiter, unitary with the layer, continuously extends at least partially about the first corner fastener through-opening, entirely along the short side and at least partially about the second corner fastener through-opening.

A second deformation limiter may extend at least partially about at least one of the side fastener through-openings.

A half bead, unitary with the layer, may contain the corner fastener through-openings and at least one of the side fastener through-openings.

Both of the deformation limiters comprise a plurality of troughs and crests that are all substantially aligned with one another and which are oriented substantially transverse to the plane of the layer.

In order to optimally adapt the gasket to the properties of the parts to be sealed and to the bolt forces required, the properties of the deformation limiters may change in their course, e.g. their height, the distance between the crests and troughs, the shape of the crests and troughs as well as the degree of tapering of the flanks between crests and troughs may change.

It is preferred in all embodiments that the combustion gas through opening is sealed by a resilient bead which is accompanied by a bead deformation limiter. In general, the height of the bead (or if there are beads in more than one gasket layer the sum of their height) is larger than the height of the bead deformation limiter and the height of the bead deformation limiter is larger than the height of the first or second deformation limiter.

It is preferred that the first and second deformation limiter are situated in the same gasket layer as the bead deformation limiter, especially if the bead deformation limiter is also formed unitary with the gasket layer, they may however also be situated in different layers.

In order to optimize the resiliency and the durability of the gasket, the layers containing sealing beads, but preferably also the layers containing the deformation limiters are formed from spring steel or other steels providing resilient properties to the respective gasket layer.

Layers may be 1-sided or both sided, partially or fully coated with coatings known from the state of the art, especially fluoro rubber coatings. The coating may be applied after the respective gasket layer has been shaped or beforehand.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1 provides a schematic depiction of a plan view of a portion of a gasket including at least one combustion gas through-opening and at least two fastener through-openings where specific portions of each fastener through-opening are depicted in views A, B, C and D;

FIG. 2 schematically depicts one embodiment of the present invention along lines 2-2 of FIG. 1;

FIG. 3 schematically depicts another embodiment of the present invention along lines 3-3 of FIG. 1;

FIG. 11 provides a schematic depiction of a plan view of a portion of another gasket of the present invention including at least one combustion gas through-opening and at least two fastener through-openings;

FIG. 11A provides a detail of part of the present invention depicted in FIG. 11.

FIG. 12 provides a schematic side view along line A-A of FIG. 11;

FIG. 13 provides a schematic side view along line B-B of FIG. 11;

FIG. 14 provides a schematic detail of part of the present invention;

FIG. 15 provides a schematic side view of an alternative embodiment along line 9-9 of FIG. 8;

FIG. 16 provides yet another schematic side view of an alternative embodiment along line 9-9 of FIG. 8;

FIG. 17 provides a schematic depiction of a plan view of an alternative embodiment to the structure shown in FIG. 11;

FIG. 18 provides a schematic side view along line A-A of FIG. 17;

DETAILED DESCRIPTION OF THE PREFERRED EMBODIMENTS

Figure 4:
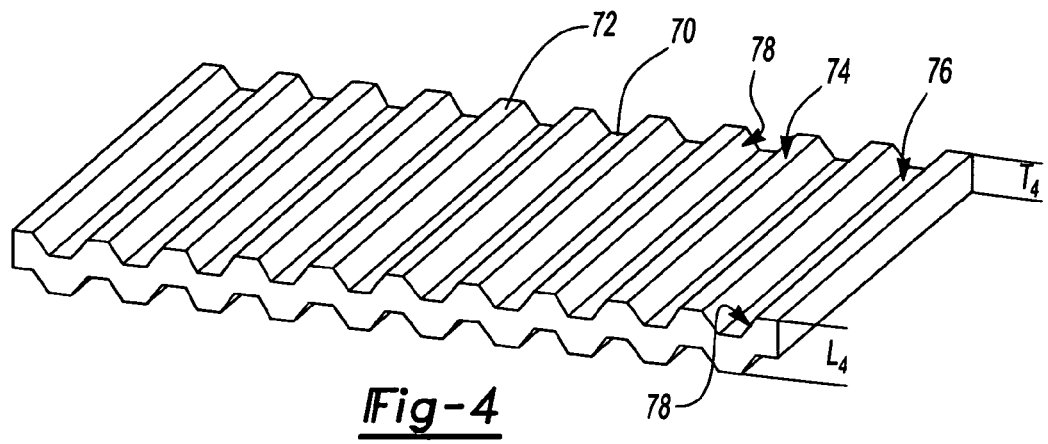
FIG. 4 schematically depicts one embodiment of a deformation limiter of the present invention.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Turning now to FIG. 1 a gasket 20, such as a gasket for an exhaust manifold for an internal combustion engine, is depicted. Those skilled in the art will readily appreciate that only a portion of the gasket 20 is shown in FIG. 1 and that the gasket 20 may be of any length and contain any number of combustion gas through-openings 22. It should also be appreciated that while an exhaust manifold gasket is depicted, the present invention may be applied to any type of gasket, including a cylinder head gasket and/or a flange gasket for an internal combustion engine. The invention is applicable to gaskets having only one combustion gas through opening. It is however preferred for gaskets comprising at least two and even more preferred for gaskets having at least three combustion gas through openings, since the forces introduced by the fastening means are distributed differently between terminal and inner combustion gas through openings.

A longitudinal axis 24 has been identified on the gasket 20 in FIG. 1. This axis 24 will be used as a reference for features of the gasket 20 discussed in more detail below.

The gasket 20 may be comprised of a single layer 21 of material, such as metal, or it may be comprised of more than one layer. If more than one layer, the layers may be comprised of the same material or dissimilar materials. In general, steel materials are preferred but aluminum and other metal materials are possible as well. For layers containing beads, it is preferred that they have resilient properties so that spring steel is preferred. For applications with extremely hot temperatures, steels having a high content in nickel or its equivalents are preferred.

An outermost peripheral edge 26 of the gasket 20 is schematically depicted in FIG. 1, however, the present invention is not limited to the specific shape defined by the edge 26. Instead, the edge 26 may define any shape appropriate for the gasket 20 application.

In addition to the combustion gas through-openings 22, the gasket defines at least one fastener through-opening 28. Preferably, the gasket 20 has at least two or more openings including fastener through-openings, as well as tappets and center means. The fastener through-openings 28 receive fasteners (not shown) for securing two components together. The components may be such as a cylinder head 30 and an exhaust manifold 32 of an internal combustion engine, which can be appreciated from FIG. 2. The fastener through-openings 28 may be located anywhere about the gasket 20 but are preferably located between the combustion gas through-openings 22 and the outermost peripheral edge 26 of the gasket 20.

The fastener through-openings 28 are preferably at least partially circumferentially bounded by a deformation limiter 34. In some instances, it is preferable to entirely circumferentially bound a fastener through-opening 28. However, in other instances, perhaps in the same gasket 20 with entirely circumferentially bounded fastener-through openings 28, a fastener through-opening 36 is only partially bounded by a deformation limiter 34. All of the deformation limiters 34 described herein prevent excessive deformation of the parts to be sealed which may be caused by an interaction of the bead deformation limiter, variable resiliency of the parts to be sealed and the fastener forces.

The term "partially bounded" as used herein means any embodiment wherein the fastener through-opening 28 is not continuously bounded by a deformation limiter 34. Such embodiments may include only a section or sections of the fastener through-opening 28 being bounded by the deformation limiter 34.

The deformation limiter 34 is preferably comprised of a plurality of troughs 38 that are substantially identical to one another and a plurality of crests 40 that are substantially identical to one another. Thus, the individual troughs 38 have identical breadth and are arranged an identical distance from one another. Similarly, the crests 40 have identical breadth and are arranged an identical distance from one another. It is possible, however, to choose different or varying distances between the troughs 38 and crests 40.

The individual troughs 38 and crests 40 of the deformation limiter 34 preferably alternate with one another. The individual troughs 38 and crests 40 of the deformation limiter 34 are also preferably aligned with and parallel to one another and they may also be aligned with the longitudinal axis 24 of the gasket 20.

FIGS. A and B in FIG. 1 depict one embodiment of a deformation limiter 34 about a fastener through-opening 28. FIG. A shows the orientation of the plurality of troughs and crests 38, 40 at a first portion 42 about one fastener through-opening 28. Here, the troughs and crests 38, 40 are aligned with the longitudinal axis 24 of the gasket 20, however, they are not radially aligned with the fastener through-opening 28. FIG. B shows the orientation of the plurality of troughs and crests at a second portion about the same fastener through-opening. It can be appreciated from FIG. B that at least one trough 38 and at least one crest 40 in the second portion 44 are aligned with the longitudinal axis 24 of the gasket 20 and they are extending radially from the fastener through-opening 28.

The first portion 42 and the second portion 44 discussed above may be located anywhere about the fastener through-opening 28. Preferably, with respect to one another, the first portion 42 may be located approximately 90 degrees from the second portion 44 about the fastener through-opening 28.

The deformation limiter 34 may also comprise a third portion 46. The third portion 46 may be comprised of a plurality of troughs and crests 38, 40 substantially identical to the troughs and crests 38, 40 of the first and second portions 42, 44 and also being aligned therewith. The third portion 46 may be located approximately 180 degrees from the first portion 42 about the fastener through-opening 28.

The deformation limiter 34 may also comprise a fourth portion 48. The fourth portion 48 may be comprised of a plurality of troughs and crests 38, 40 substantially identical to the troughs and crests 38, 40 of the first, second and third portions 42, 44, 46 and also be aligned therewith. The fourth portion 48 may be located approximately 180 degrees from the second portion 44 about the fastener through-opening 28.

The fastener through-opening 28 has an innermost peripheral edge 50. Preferably, the troughs and crests 38, 40 of the deformation limiter 34 substantially extend from the innermost peripheral edge 50 of the fastener through-opening 28. In an alternative embodiment (not depicted), a half bead might be located between the peripheral edge of the fastener through-opening 28 and the deformation limiter 34. The deformation limiter 34 about each fastener through-opening 28 is only a single trough 38 or crest 40 deep. An outer terminal periphery 52 of the deformation limiter 34 is defined by the outer termini 54 of the troughs 38 and crests 40 as they extend about the fastener through-opening 28. The outer termini 54 of the troughs 38 and crests 40 together form the outer terminal periphery 52 of the deformation limiter 34.

It can be appreciated that as the troughs 38 and crests 40 are arranged around a substantially circular fastener through-opening 28 that the terminus 54 of individual troughs 38 and crests 40 become offset axially from one another with respect to the longitudinal axis 24.

Outwardly from the outer terminal periphery 52 of the deformation limiter 34 it is preferred that the metal layer, which is unitary with the deformation limiter 34, comprises a substantially planar land portion 56. The planar portion 56 can be appreciated from FIGS. 1, 2 and 3.

In certain instances, other deformation limiting structures or sealing structures may be located about the combustion gas through-openings 22 in the gasket 20. Preferably, these structures are separated from the fastener through-opening deformation limiter 34 by the planar portion 56, but it is not required. The sealing structures may be such as a full or half bead 58 located at least partially about the combustion gas through-opening 22. The full or half bead 58 may be concave or convex, rounded or angular in shape as can be appreciated from FIGS. 2 and 3, respectively. The sealing structures are preferably unitary with at least one of the metal layers, and the structures may be formed in a unitary manner with each metal layer.

Between the combustion gas through-opening 22 and the sealing structure 58 and/or on the other side of the sealing structure 58, one or more bead deformation limiters 60 may be provided. As can be appreciated from FIGS. 2 and 3, the metal layers may have unitary bead deformation limiters 60 of varying shape and dimension, including no bead deformation limiter at all. Other embodiments with different, specially non-unitary bead deformation limiters are feasible as well. While FIGS. 2 and 3 are shown as cross sections of FIG. 1, those skilled in the art will appreciate they represent different cross sections. These cross sections, however, are presented herewith as alternative embodiments. FIGS. 2 and 3 also depict two layer gasket systems.

Items C and D in FIG. 1 depict another deformation limiter 62 about a fastener through-opening 64. Items C and D recognize the possibility that the troughs 66 and crests 68 of different deformation limiters 62 about the various fastener through-openings 64 need not be aligned with one another. It is also within the scope of the present invention for the one deformation limiter at one fastener through-opening to have a different height than a deformation limiter located about another fastener through-opening in the same gasket. This may be done to accommodate varying rigidities of the parts to be sealed at different locations about the gasket together with their respective distance to the fastener through-openings.

Turning now to FIGS. 4-7, several different fastener through-opening deformation limiters within the scope of the present invention are depicted. The deformation limiters depicted in these figures are examples of possible designs. The present invention, however, is not limited to just the depicted designs, instead, other designs may be acceptable alternatives. It can be appreciated from each of the designs that the deformation limiters are formed entirely from and within a single metal layer that is not folded onto itself.

FIG. 4 depicts one embodiment of a plurality of troughs 70 and crests 72 suitable for a deformation limiter of the present invention. Each of the crests 72 has a planar top surface 74 while the troughs 70 are defined by a planar bottom surface 76. Angled planar surfaces 78 connect the top surfaces 74 with the bottom surfaces 76. The troughs 70 and crests 72 are substantially identical and integrally formed with the metal layer. As can be appreciated from FIG. 4, the crests 72 on one side of the layer are aligned with troughs 70 on the other side of the layer. The effect is that the thickness of the metal layer $T_4$ is effectively increased to $L_4$ at the deformation limiter.

Figure 5:
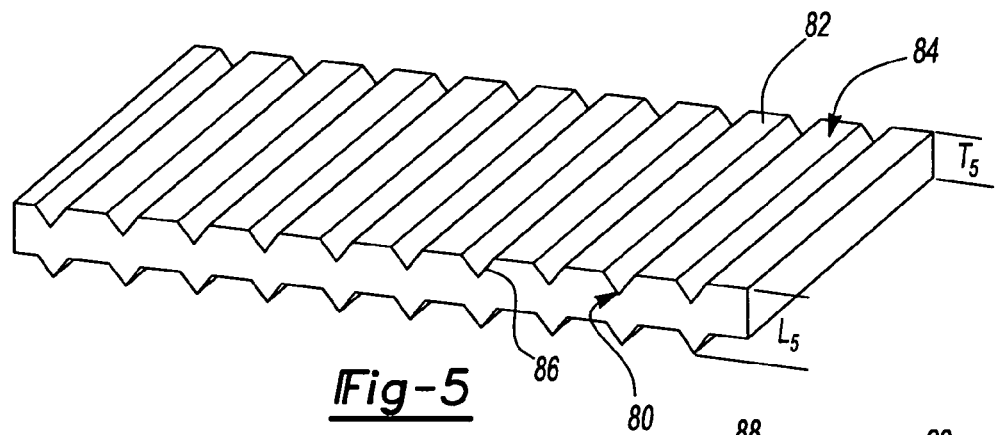
FIG. 5 schematically depicts another embodiment of yet another deformation limiter of the present invention.

FIG. 5 depicts another embodiment of a plurality of troughs 80 and crests 82 suitable for a deformation limiter of the present invention. Each of the crests 82 has a planar top surface 84. An angled planar surface 86 extends downwardly from the top surface 84 and contacts another angled planar surface 86 from an adjacent crest 82. The two angled planar surfaces 86 from a V-shaped trough 80. The troughs 80 are substantially identical to one another and the crests 82 are substantially identical to one another. Both the troughs 80 and the crests 82 are integrally formed with the metal layer. As can be appreciated from FIG. 5, the crests 82 on one side of the layer alternate with troughs 80 on the other side of the layer. The effect is that the thickness of the metal layer $T_5$ is increased to $L_5$ at the deformation limiter.

Figure 6:
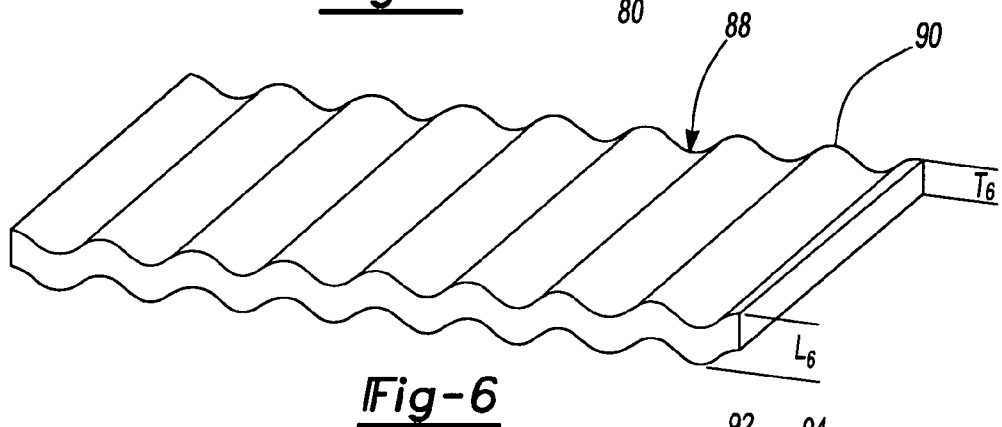
FIG. 6 schematically depicts another embodiment of yet another deformation limiter of the present invention.

FIG. 6 depicts another embodiment of a plurality of troughs 88 and crests 90 suitable for a deformation limiter of the present invention. The troughs 88 and crests 90 are formed from the same continuous curvilinear line. The troughs 88 and crests 90 are substantially identical and integrally formed with the metal layer. As can be appreciated from FIG. 6, the crests 90 on one side of the layer alternate with troughs 88 on the other side of the layer. The effect is that the thickness of the metal layer $T_6$ is effectively increased to $L_6$ at the deformation limiter.

Figure 7:
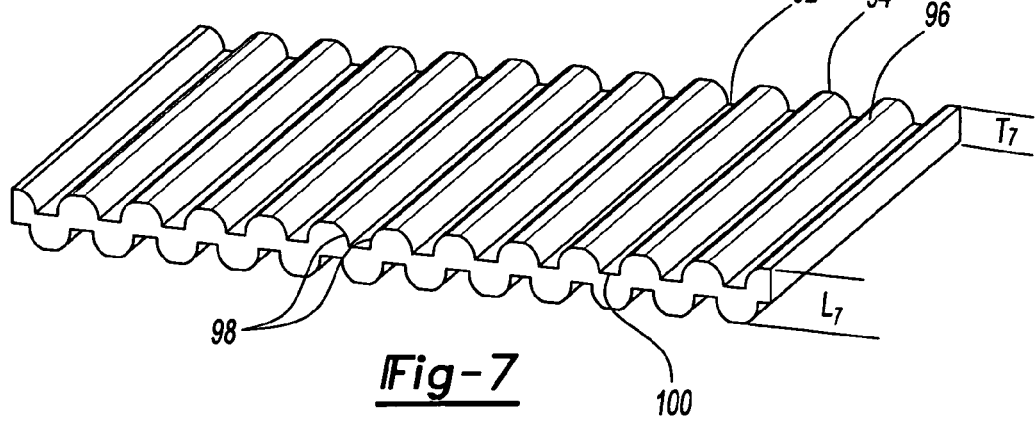
FIG. 7 schematically depicts another embodiment of yet another deformation limiter of the present invention.

FIG. 7 depicts yet another embodiment of a plurality of troughs 92 and crests 94 suitable for a deformation limiter of the present invention. The plurality of crests 94 are formed from a planar upper surface 96 connected to two curvilinear, downwardly extending surfaces 98. The curvilinear surfaces 98 terminate in planar surfaces 100 that form troughs 92. The troughs 92 on one side of the metal layer alternative with crests 94 on the other side of the layer. The effect of this arrangement is that the thickness $T_7$ of the metal layer is increased to $L_7$.

The above described troughs and crests, regardless of their shape, being only a single wave or trough deep from the innermost peripheral edge 50 of the fastener through-opening 28, are collectively a first cohort. A second cohort of alternating troughs and crests, being only a single wave or trough deep, may be located between the first cohort about the fastener through-opening 28 and the substantially planar portion of the metal layer. Preferably, the second cohort is located outwardly from the outer terminal periphery 52 of the first cohort. The termini of the troughs and crests of the second cohort define an outermost periphery (not shown). The troughs and crests of the second cohort are preferably aligned with the troughs and crests of the first cohort. While a second cohort has been disclosed, it is preferred that no other cohorts are provided about a fastener through-opening.

Another feature of the present invention that may exist with the deformation limiters 34 about the fastener through-openings 28, or that may exist entirely by itself on a gasket 20, is a deformation limiter 102 located about at least a portion of the outermost peripheral edge 28 of the gasket 20. The deformation limiter 102 can be seen in FIG. 1. The deformation limiter 102 may be comprised of a first cohort and at the most a second cohort, as described above.

Figure 8:
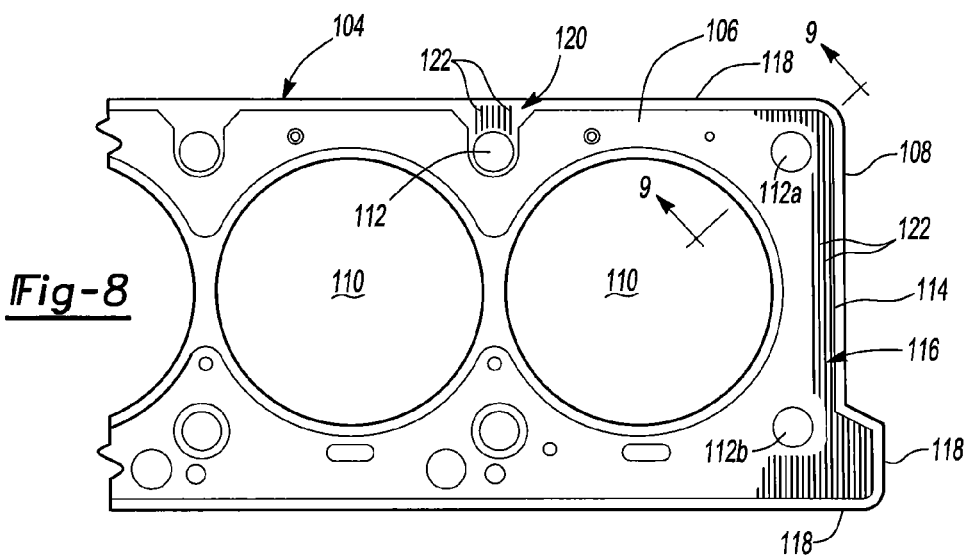
FIG. 8 provides a schematic depiction of a plan view of a portion of another gasket of the present invention including at least one combustion gas through-opening and at least two fastener through-openings.
Figure 9:
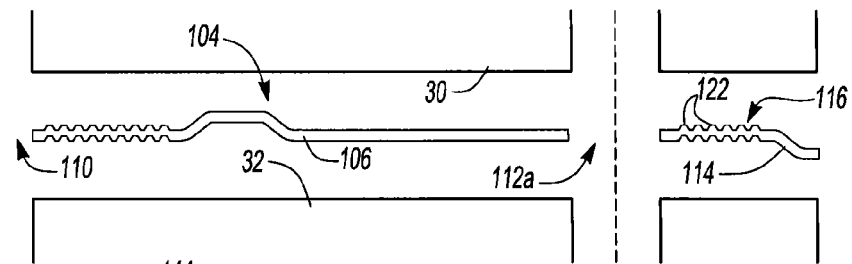
FIG. 9 provides a schematic side view along lines 9-9 of FIG. 8.

Another embodiment of the present invention is depicted in FIGS. 8 and 9. There, a cylinder head gasket 104 is provided having at least one metallic layer 106 having an outermost peripheral edge 108 that entirely bounds at least one combustion gas through-opening 110 and at least two fastener through-openings 112. Further through openings, e.g. cooling water and oil through openings, are present as well. A half bead 114, unitary with the layer 106, and located immediately inwardly adjacent the outer peripheral edge 108 may be provided.

A first deformation limiter 116 unitary with the layer 106 and extending substantially continuously from one of the fastener through-openings 112a to another of the fastener through-openings 112b is provided. The first deformation limiter 116 is preferably located immediately inwardly adjacent the half bead 114. It is also preferred that the first deformation limiter 116 curves about at least one third of a perimeter of one of the fastener through-openings, 112a, 112b. The depicted embodiment also shows the first deformation limiter 116 extending at least partially around at least two adjacent sides 118 of the gasket 104.

A second deformation limiter 120, also unitary with the layer 106, but separated from the first deformation limiter 116, is also provided. The second deformation limiter 120 may be located between one of the fastener through-openings 112 and the edge 108.

Preferably, the first and the second deformation limiters 116, 120 are both comprised of a plurality of troughs and crests 122, as described above. All of the troughs and the crests 122 are substantially aligned with one another and oriented substantially transverse to the plane of the layer 106.

Figure 10:
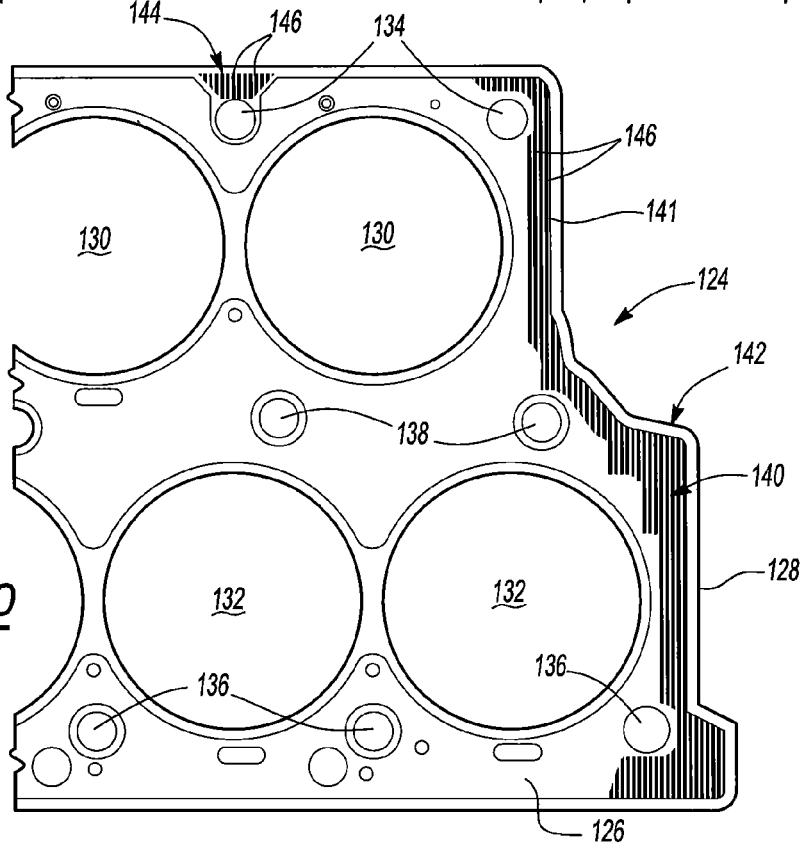
FIG. 10 provides a schematic depiction of a plan view of a portion of another gasket of the present invention including at least one combustion gas through-opening and at least two fastener through-openings.

Another embodiment of the present invention is depicted in FIG. 10, wherein a gasket 124 is provided having at least one metallic layer 126 having an outermost peripheral edge 128 that entirely bounds the layer 126.

For example in a so-called V-engine, a first bank of combustion gas through openings, here cylinder through-openings 130 are provided in the layer 126 and at least a second, separate bank of cylinder through-openings 132 are provided in the layer 126.

A first set of fastener through-openings 134 are provided in the layer 126 outboard of the first bank of cylinder through-openings 130. A second set of fastener through-openings 136 are also provided in the layer 126 outboard of the second bank of cylinder through-openings 132. A third set of fastener through-openings 138 are located in the layer 126 between the first bank of cylinder through-openings 130 and the second bank of cylinder through-openings 132.

A first deformation limiter 140 unitary with the layer 126 is provided. The first deformation limiter 140 may continuously extend along one edge 142 of the layer 126 and at least partially bound at least one fastener through-opening of the first set 134, at least one fastener through-opening of the second set 136 and at least one fastener through-opening of the third set 138.

Also provided is a second deformation limiter 144 unitary with the layer 126 and separated from the first deformation limiter 140 and located between at least one of the fastener through-openings of the first set 134 or the second set 136 and the edge 128. In the preferred depicted embodiment, the second deformation limiter 144 does not extend inboard beyond either the first set or the second set of fastener through-openings 134, 136.

Preferably, both the first deformation limiter 140 and the second deformation limiters 144 are comprised of a plurality of troughs and crests 146 that are substantially aligned with one another.

The gasket 124 depicted in FIG. 10 can for instance be a one-layer gasket or one layer of a gasket in which a half-bead 139 runs at an almost constant distance along the peripheral edge 128. This half bead 139 comprises the first deformation limiter 140. In contrast, the second deformation limiter 144 extends between the peripheral edge 128 and the half bead 139.

The gasket 124 visible in FIG. 10 can also show a two-layer gasket or two-layers of a multi-layer gasket in which the peripheral edges of the layers are not aligned. Rather, the upper layer shows an outer edge 141 that is enclosed by the peripheral edge 128 of the lower layer. In this embodiment, the first deformation limiter 140 is unitary with the upper layer while the second deformation limiter 144 is unitary with the lower layer. Thus, in a gasket with more than one layer, deformation limiters may be formed unitary with different layers.

FIGS. 11, 12 and 13 depict yet another embodiment of a gasket 148 having at least one metallic layer 150 having an outermost peripheral edge 152 defining a substantially rectangular gasket with at least one short side 154 and at least two long sides 156. Preferably, the edge 152 entirely bounds at least one combustion gas through-opening 158, a first corner fastener through-opening 160, at least a second corner fastener through-opening 162 and at least two side fastener through-openings 164 all in one layer.

A first deformation limiter 166 continuously extends at least partially about the first corner fastener through-opening 160, along the short side 154 and at least partially about the second corner fastener through-opening 162.

A second deformation limiter 168 extends at least partially about at least one of the side fastener through-openings 164.

As can be seen from the sectional views in FIGS. 12 and 13, a half bead 170 is provided that extends between the outer edge 152 of the gasket 148 and one of the combustion gas through openings 158, to be more precise between the corner fastener through-openings 160, 162 and at least one of the side fastener through-openings 164 on the one hand and one of the combustion gas through-openings 158 and the planar portion 151 on the other hand.

Other than depicted in the sectional views of FIGS. 12 and 13, gasket 148 could also be a two-or more layer gasket. In this case, 171 marks the outer edge of the upper layer which is completely enclosed by the peripheral edge 152 of the lower layer. Both deformation limiters 166, 168 are unitary with the lower layer and extend between the peripheral edge 152 of the lower layer and the outer edge 171 of the upper layer, with the fastener-through openings 160, 162, 164 being situated between the deformation limiters 166, 168 and the outer edge 171.

Preferably, both of the deformation limiters 166, 168 comprise a plurality of troughs and crests 172. More preferably, all of the troughs and crests 172 are substantially aligned with one another and they are all oriented substantially transverse to the plane of the layer 150. As shown in the figures, the waves and troughs 172 do not connect the first deformation limiter 166 with the second deformation limiter 168. None of the deformation limiters 166, 168 extends to the peripheral edge 152 of the gasket 148. This distance preferably is at least 3 times the length of a period of the crests and the troughs, thus three times the width of a crest plus three times the width of a trough.

Although at first sight, in some embodiments, the structure of the crests and troughs may resemble a bead, this structure has less resiliency than the latter, which is also due to a tapering, which is preferably present in a region of transition between the crests and the troughs of the deformation limiters, referred to as flank. FIG. 14 shows this tapering for a trapezoidal profile of the deformation limiter. The same is however also true for other shapes of crests and troughs. The structures are generated preferably by means of embossing. In this case the material in the region of the flank is reduced relative to the material thickness in the region of the elevations and depressions, thus rigidifying the deformation limiter. The elevations 174 protrude by a predetermined height beyond the surface of the gasket layer 178. As a result of the embossing, the thickness of the gasket layer 178 in the region of the flanks 180 has been reduced relative to the thickness of the elevations 174 or depressions 176. The thickness $D_{18}$ in the flank region is therefore less than the thickness $D_{17}$ of the gasket layer 178 in the region of the elevations or depressions. This reshaping of the material and reduction of the material thickness leads to an increase in the rigidity of the structured region. The extent of the flank tapering is drawn in an exaggerated manner in FIG. 14. The material tapering in the flank region is in this case at least 8%, preferably at least 10%, particularly preferably at least 13% and in particular at least 15% relative to the material thickness in the region of the adjacent elevation or depression.

Moreover, the width of crest and trough is smaller than the one of a bead. This can for instance be shown with respect to the thickness of the gasket layer. The ratio between the width of a bead (starting from the point where it raises out of the plane) and the thickness of the unstructured gasket layer is at least 6, preferably at least 7. In contrast, the ratio between a period P of the crests and troughs and the original thickness of the layer $D_{17}$ is at the most 4, preferably between 2.5 and 3.5.

FIGS. 15 and 16 depict variations of the embodiment given in FIGS. 8 and 9. While the top-view for both embodiments of FIGS. 15 and 16 corresponds to FIG. 8, their sectional view deviates, since both show multi layer gaskets. In the three-layer embodiment of FIG. 15 the first deformation limiter 116 is located in a layer 106 adjacent to the layer 182 in which the half-bead 114 is located. The outer edges 186, 188 and 190 of the three layers 106, 182 and 184 are flush with each other. In contrast, in the two-layer embodiment of FIG. 16, the upper layer 106 containing the first deformation limiter 116 does not extend outwardly as far as the outer edge 194 of the lower layer 192. In fact, the outer edge of the lower layer 192 is comprised of the half bead 114.

Figure 19:
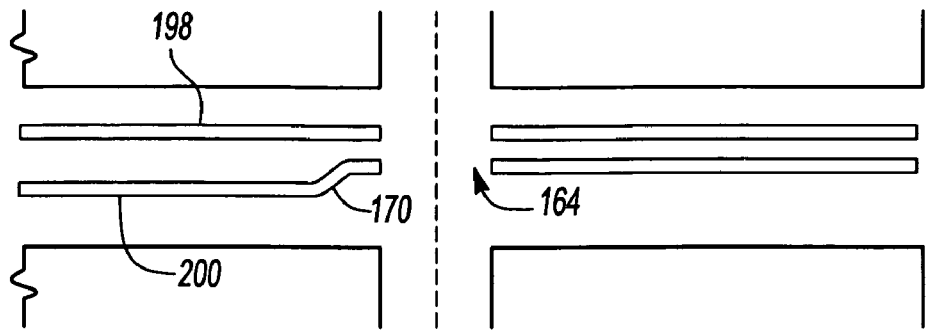
FIG. 19 provides a schematic side view along line B-B of FIG. 17.
Figure 20:
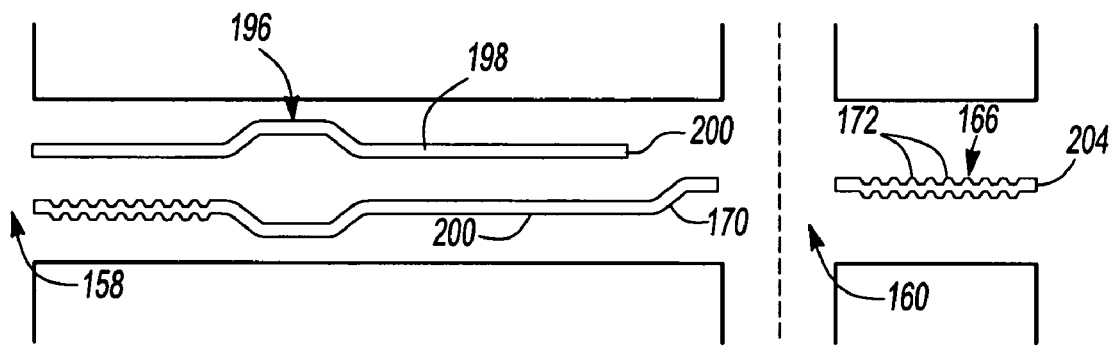
FIG. 20 provides an alternative schematic side view along line A-A of FIG. 17.
Figure 21:
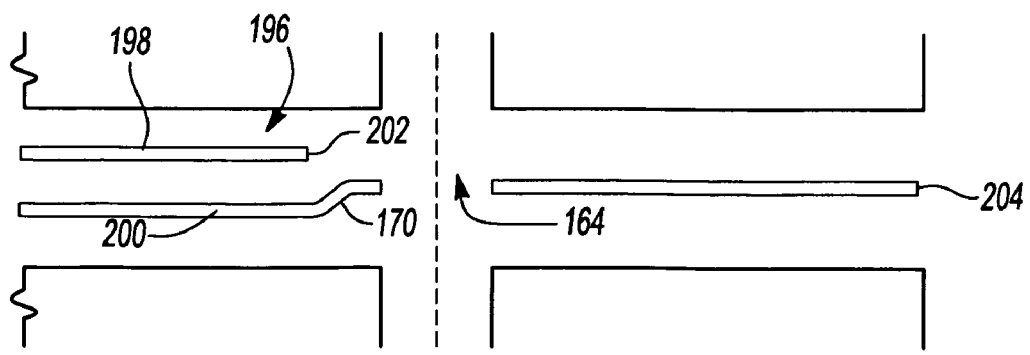
FIG. 21 provides an alternative schematic side view along line B-B of FIG. 17.

FIGS. 17 to 21 show variations of the embodiments given in FIGS. 11 to 13, all of them being two-layered and desisting from a second deformation limiter, as becomes clear from the sectional views of FIGS. 19 and 21. In a first variation, given in FIGS. 18 and 19, the gasket 196 comprises two layers 198 and 200, with the first deformation limiter 166 being located in the upper layer 198 and the half-bead 170 located in the lower layer 200. The outer edges 202, 204 of the two layers are flush with each other. In a second variation, given in FIGS. 20 and 21, the first deformation limiter 166 and the half-bead 170 are both located in the lower layer 200. The upper layer 198 does not extend outwardly as far as the lower layer 200 but its outer edge 202 is located adjacent to and comprised by the half bead 170.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:
1. A gasket, comprising:
 at least one metallic layer having at least one combustion gas through-opening and at least one fastener through-opening, wherein said fastener through-opening is at least partially circumferentially bounded by a deformation limiter entirely comprised of a plurality of linearly aligned troughs and crests, wherein all of said troughs and crests are substantially parallel with one another around said fastener through-opening along a longitudinal axis of said layer.
2. The gasket of claim 1, wherein said fastener through-opening is entirely bounded by said deformation limiter.

3. The gasket of claim 1, wherein said deformation limiter has an outer terminal periphery beyond which said troughs or crests of said deformation limiter do not extend.

4. The gasket of claim 1, wherein a first portion of said plurality of said troughs and crests extends substantially radially from said at least one fastener through-opening and a second portion of said plurality of said troughs and crests extends non-radially from said same fastener through-opening.

5. The gasket of claim 4, wherein said first portion and said second portion are approximately 90 degrees apart from one another about said fastener through-opening.

6. The gasket of claim 5, wherein a third portion, having troughs and crests aligned with the troughs and crests of said first portion, is located approximately 180 degrees from said first portion about said fastener through-opening.

7. The gasket of claim 4, wherein a fourth portion, having troughs and crests aligned with the troughs and crests of said second portion, is located approximately 180 degrees from said second portion about said fastener through-opening.

8. The gasket of claim 1, wherein a land portion of said gasket immediately radially outward said outer terminal periphery is substantially planar.

9. The gasket of claim 1, wherein said deformation limiter is a single trough or a single crest deep from said fastener through-opening to said land portion at said first portion.

10. The gasket of claim 1, wherein an outboard terminus of one trough is axially offset from an outboard terminus of an immediately adjacent trough.

11. The gasket of claim 1, wherein said at least one combustion gas through-opening is surrounded by a sealing bead and at least partially surrounded by a bead deformation limiter, wherein the height of said bead deformation limiter is larger than the height of said deformation limiter.

12. The gasket of claim 1, wherein a flank is formed between each pair of adjoining crests and troughs, the material thickness at the flank being reduced relative to the material thickness at the crest or the trough by at least 8%.

13. The gasket of claim 1, wherein at least one of the height of said deformation limiter or the distance between its crests and troughs or the degree of flank tapering changes over the area of said deformation limiter.

14. A gasket, comprising:
at least one metallic layer having at least one combustion gas through-opening and at least one fastener through-opening;
a deformation limiter comprised of a first cohort of a plurality of troughs and crests extending from an innermost peripheral edge of said fastener through-opening to an outer terminal periphery and being only one trough or one crest deep from said fastener through-opening to said outer terminal periphery, said first cohort comprised of a first portion having at least one trough or crest that extends radially from said peripheral edge to said outer terminal periphery, said first cohort also comprised of a second portion having a plurality of troughs and crests extending non-radially between said peripheral edge to said outer terminal periphery.

15. The gasket of claim 14, wherein a portion of said gasket immediately radially adjacent said outer terminal periphery is substantially planar.

16. The gasket of claim 14, wherein said at least one combustion gas through-opening is surrounded by a sealing bead and at least partially surrounded by a bead deformation limiter, wherein the height of said bead deformation limiter is larger than the height of said deformation limiter.

17. The gasket of claim 14, wherein a flank is formed between each pair of adjoining crests and troughs, the material thickness at the flank being reduced relative to the material thickness at the crest or the trough by at least 8%.

18. A gasket, comprising:
at least one metallic layer having at least one combustion gas through-opening, a first fastener through-opening and at least a second fastener through-opening, wherein said first fastener through-opening is at least partially circumferentially bounded by a first deformation limiter and said second through-opening is at least partially circumferentially bounded by a second deformation limiter, wherein both of said deformation limiters are comprised of a plurality of troughs and crests, wherein the troughs and crests of said first deformation limiter are substantially aligned with one another around said first fastener through-opening along a first direction and said troughs and crests of said second deformation limiter are all aligned with one another in a second direction different than said first direction.

19. The gasket of claim 18, wherein said deformation limiter is unitary with and entirely formed from and within a single metallic layer that is not folded onto itself in the area of the deformation limiter.

20. The gasket of claim 18, wherein said at least one combustion gas through-opening is surrounded by a sealing bead and at least partially surrounded by a bead deformation limiter, wherein the height of said bead deformation limiter is larger than the height of said deformation limiter, wherein the bead deformation limiter and the deformation limiter are formed unitary from the same metallic layer and neither the bead deformation limiter nor the deformation limiter is folded onto itself.

21. A gasket, comprising:
at least one metallic layer having an outermost peripheral edge that entirely bounds at least one combustion gas through-opening and at least two fastener through-openings;
a half bead unitary with said layer and at least partially located immediately inwardly adjacent said outer peripheral edge;
a first deformation limiter unitary with said layer, or an adjacent layer, and extending substantially continuously from one of said fastener through-openings to another of said fastener through-openings;
a second deformation limiter unitary with said layer, or an adjacent layer, separated from said first deformation limiter, and located between one of said fastener through-openings and said edge;
wherein said first and second deformation limiters are both comprised of a plurality of linearly aligned troughs and crests, wherein all of said troughs and crests are substantially parallel with one another.

22. The gasket of claim 21, wherein at least said first deformation limiter is located immediately inwardly adjacent said half bead.

23. The gasket of claim 21, wherein said first deformation limiter and said second deformation limiter are located on different sides of said half bead.

24. The gasket of claim 21, wherein said first deformation limiter curves about at least one third of a perimeter of one of said fastener through-openings.

25. The gasket of claim 21, wherein said first deformation limiter extends at least partially around at least two adjacent sides of said gasket.

26. A gasket, comprising:
at least one metallic layer having an outermost peripheral edge defining a substantially rectangular gasket with at least one short side and two long sides, said edge entirely bounding at least one combustion gas through-opening, a first corner fastener through-opening, at least a second corner fastener through-opening and at least two side fastener through-openings all in said layer;
a first deformation limiter, unitary with said layer, continuously extending at least partially about said first corner fastener through-opening, entirely along said short side and at least partially about said second corner fastener through-opening;
a half bead, unitary with said layer, or an adjacent layer, extending between the outermost peripheral edge and the at least one combustion gas through-opening;
wherein said deformation limiter comprises a plurality of linearly aligned troughs and crests, wherein all of said troughs and crests are substantially parallel with one another.

27. The gasket of claim 26, wherein a second deformation limiter is unitary with said layer, extending at least partially about at least one of said side fastener through-openings, said first and second deformation limiters being located on the same side of said half bead.

28. The gasket of claim 27, wherein waves and troughs do not connect said first deformation limiter with said second deformation limiter.

29. A gasket, comprising:
at least one metallic layer having an outermost peripheral edge that entirely bounds said layer;
a first bank of combustion gas through-openings in said layer and at least a second, separate bank of combustion gas through-openings in said layer;
a first set of fastener through-openings in said layer outboard of said first bank of combustion gas through-openings;
a second set of fastener through-openings in said layer outboard of said second bank of combustion gas through-openings;
a third set of fastener through-openings in said layer located between said first bank of combustion gas through-openings and said second bank of combustion gas through-openings;
a first deformation limiter unitary with said layer and continuously extending along one edge of said layer and at least partially bounding at least one fastener through-opening of said first set, at least one fastener through-opening of said second set and at least one fastener through-opening of said third set
wherein said first deformation limiter is comprised of a plurality of linearly aligned troughs and crests that are substantially parallel with one another.

30. The gasket of claim 29, wherein a second deformation limiter is formed unitary with said layer and separated from said first deformation limiter and located between at least one of said fastener through-openings of said first set or said second set and said edge; and
wherein both said first deformation limiter and said second deformation limiters are comprised of a plurality of troughs and crests that are substantially aligned with one another.

31. The gasket of claim 30, wherein said second deformation limiter does not extend inboard beyond said either said first set or said second set of fastener through apertures.

* * * * *